Figure 1:
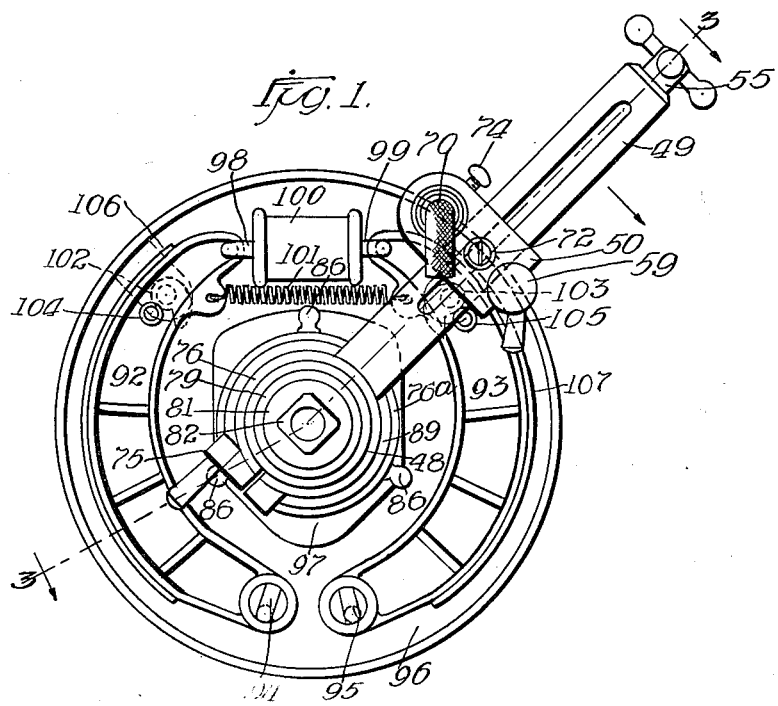

Sept. 1, 1936. J. KUHLE 2,052,981
MACHINE FOR SURFACING BRAKE SHOES
Filed July 30, 1932 3 Sheets-Sheet 1

Witness:
Harry R. L. White

Inventor:
Jack Kuhle.
By Harvey L. Hanson
Attorney.

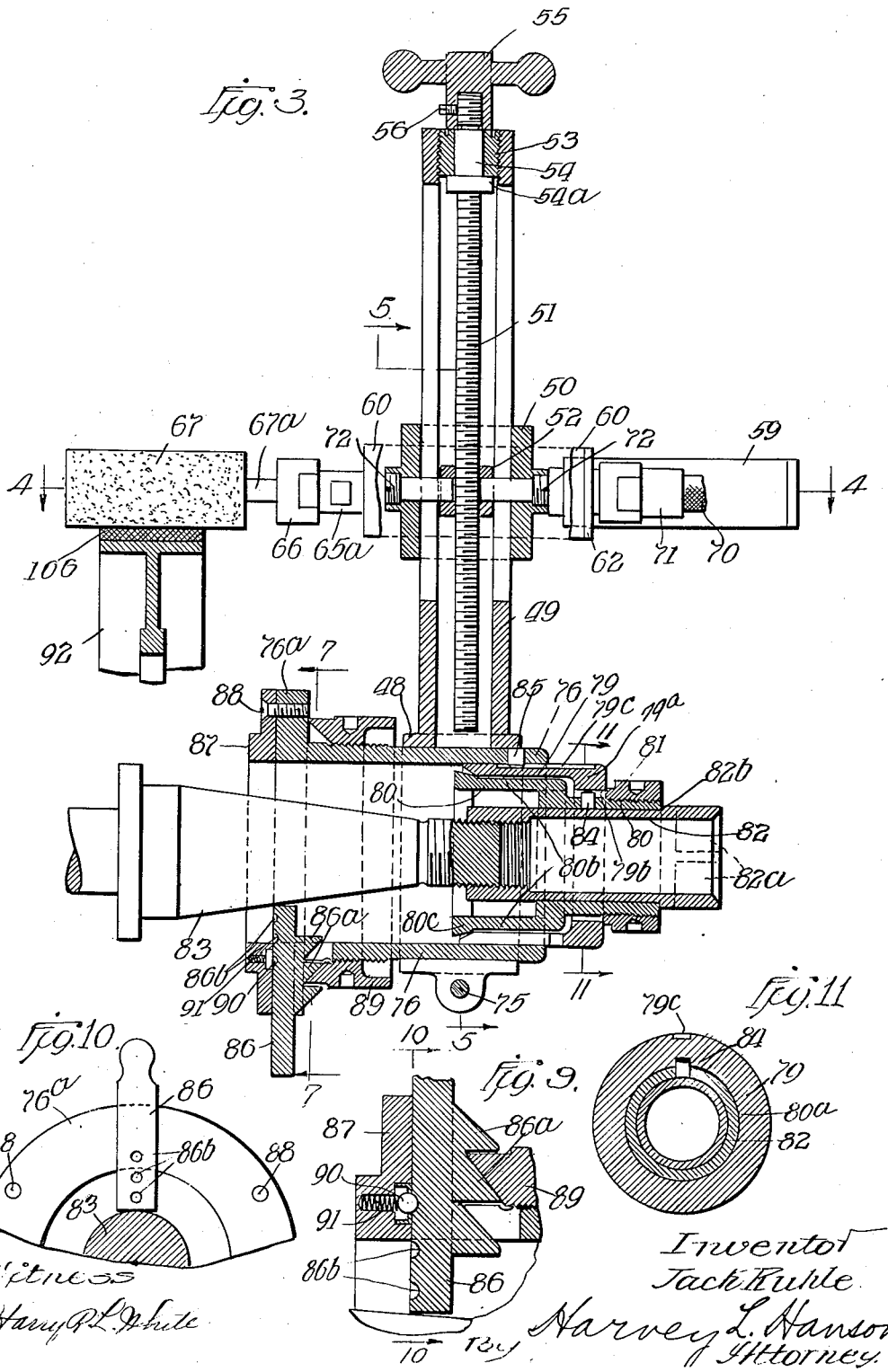

Sept. 1, 1936. J. KUHLE 2,052,981
MACHINE FOR SURFACING BRAKE SHOES
Filed July 30, 1932 3 Sheets-Sheet 3
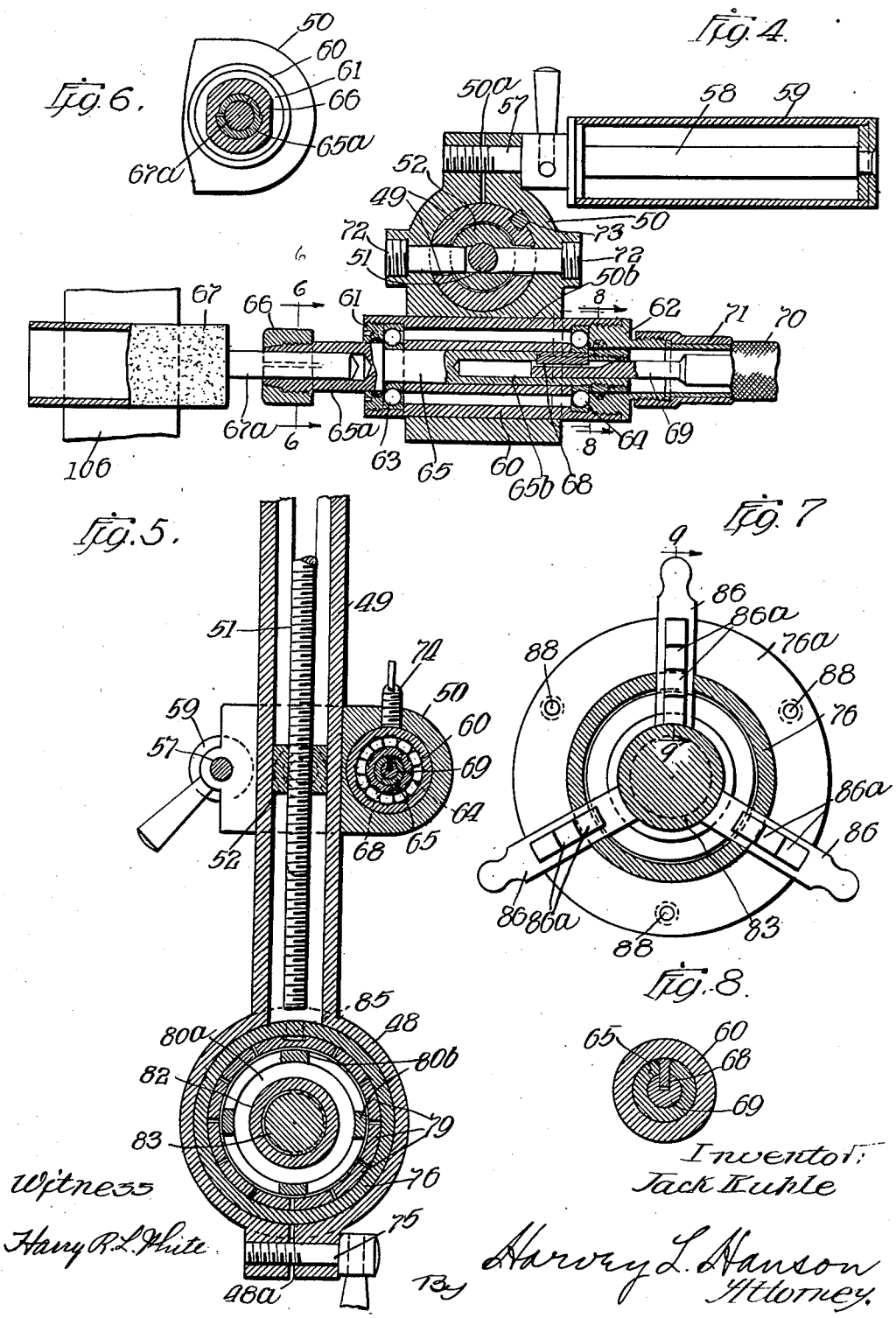

Patented Sept. 1, 1936

2,052,981

UNITED STATES PATENT OFFICE 2,052,981

MACHINE FOR SURFACING BRAKE SHOES

Jack Kuhle, Chicago, Ill.

Application July 30, 1932, Serial No. 626,431

9 Claims. (Cl. 51—241)

The invention relates to a machine for surfacing brake shoes, and particularly to an improved means for providing brake shoes with surfaces for accurately engaging the brake drums co-operating with said brake shoes, and for accurately adjusting the brake shoes relatively to the brake drums with which they cooperate, either before or after said surfacing operation, or both, my invention being particularly applicable to braking mechanism of the kind generally used in connection with motor vehicles, although I do not limit myself to braking mechanism of that nature.

My invention is particularly applicable to braking mechanisms in which the brakes consist of brake drums having expanding or contracting shoes which frequently are provided with linings to take the frictional wear incident to braking operations.

In connection with brakes of the kind referred to it is found that efficient braking action can only be secured when the braking surfaces carried by the shoes, whether provided with brake linings or not, are in such adjustment to the surface or surfaces of the brake drums with which they cooperate, that during the braking operation, the entire braking surfaces of the brake shoes are in engagement with the corresponding surfaces of the drums with substantially uniform pressure throughout. This can only be secured when the braking surfaces, whether the shoes are provided with linings or not, are true cylindrical surfaces that will accurately fit the corresponding surfaces of the brake drums during a braking operation.

By my invention I provide a system and means for imparting accurate cylindrical braking surfaces to brake shoes, whether provided with linings or not, and effecting such adjustment of the brake shoes relatively to the brake drums with which they cooperate, as to insure perfect contact and braking action between the brake shoes and the brake drums during a braking operation and uniformly over the surface of the brake shoes.

By means of a novel chucking mechanism constituting a part of my invention and secured for the purpose to the axle associated with the braking mechanism being adjusted and surfaced, I support an adjusted gauging mechanism (not shown) in position to accurately adjust the brake shoes for the surfacing operation.

When the brake shoes have been so adjusted, surfacing mechanism constituting a part of my invention, is mounted on the chucking mechanism and operated to remove from the braking surfaces of the brake shoes, any high spots or projecting portions, provision being made so that the surfacing operation may be continued until the braking surfaces of the brake shoes are accurate cylindrical surfaces that will closely fit the corresponding braking surface of the brake drum cooperating with the brake shoes.

If desired, after the surfacing of the brake shoes as described, the gauging mechanism may be again employed to give the brake shoes any desired adjustment, depending upon the amount of clearance desired between the brake shoes and the brake drum when the braking mechanism is in its released condition.

The chucking mechanism constituting a part of my invention, is constructed to include sleeves and clamping screws of different sizes and kinds, by which the chucking mechanism may readily be mounted on axles of different sizes and kinds, for example, the axles of different makes of standard automobiles and other vehicles, to the end that an accurate supporting surface is provided in any case, regardless of the nature or kind of the axle, which is concentric with the axis of the axle and therefore concentric with the axis of the brake drum when the brake drum is in use.

The brake shoe surfacing mechanism constituting a part of my invention is preferably constructed to be supported by the chucking mechanism when in place on the axle associated with the brake shoes being adjusted and surfaced, so that a cutting or grinding tool constituting a part of the surfacing mechanism may be moved over the braking surfaces of the brake shoes by angular movement of the surfacing mechanism on the chucking mechanism, suitable feeding devices being preferably provided to move the cutting or grinding tool radially to remove as much of the outer portion of the braking surface of the brake shoes, whether they are provided with linings or not, as may be required to properly surface said brake shoes for accurate engagement with the corresponding brake drum during a braking operation.

Figure 2:
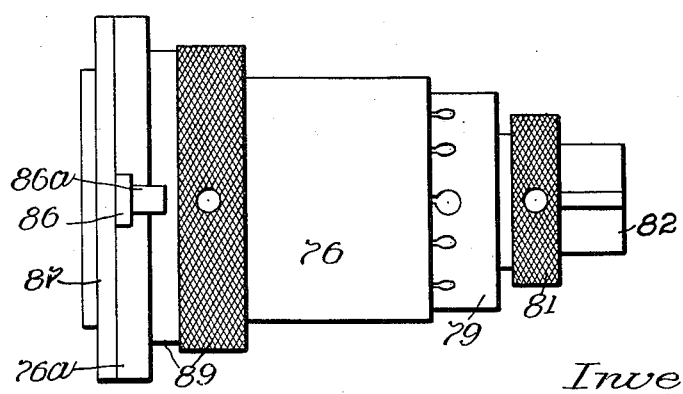

My invention will best be understood by reference to the accompanying drawings showing a preferred embodiment thereof, in which Figure 1 shows a pair of brake shoes, their mounting place and operating devices, with my chucking mechanism in place on the associated axle and my surfacing mechanism mounted on the chucking mechanism to surface the brake shoes illustrated, Figure 2 shows in bottom view, the chucking mechanism illustrated in Figure 3, Figure 3 is a longitudinal, sectional view through the arm of the surfacing mechanism illustrated in Figure 1, this view being taken along the line 3—3 in said figure, and showing to an enlarged scale, the construction of the surfacing mechanism, and also the internal construction of the chuck mechanism, Figure 4 is a horizontal, sectional view of a part of the construction shown in Figure 3, to a further enlarged scale, taken along the line 4—4, Figure 5 is a vertical, sectional view through the construction illustrated in Figure 3, taken along the line 5—5, Figure 6 is a vertical, sectional view to an enlarged scale, through a part of the construction shown in Figure 4 taken along the line 6—6, Figure 7 is a vertical, sectional view through a part of the construction shown in Figure 3 taken along the line 7—7, Figure 8 is a vertical, sectional view to an enlarged scale, through a part of the construction shown in Figure 4, taken along the line 8—8, Figure 9 is a vertical, sectional view to an enlarged scale, through a part of the construction shown in Figure 7, taken along the line 9—9, Figure 10 is a vertical, sectional view to a reduced scale of a part of the construction shown in Figure 9, taken along the line 10—10, and Figure 11 is a vertical, sectional view through a part of the construction shown in Figure 3, taken along the line 11—11.

As shown in Figure 3, the shoe surfacing or grinding mechanism consists of a hub portion 48 provided with a bore to fit the chucking mechanism in a manner to be described, from which hub portion a radial arm 49 extends and carries a head 50 thereon, which is movable radially on said arm by a feed screw 51 extending through a nut 52 carried by said head, the end of the feed screw being mounted in a plug 53 in the end of said arm, so as to be freely rotatable but incapable of longitudinal movement in said plug.

To accomplish this, the outer end of the feed screw 51 has rigidly secured thereto, a flanged bearing member 54, the flange 54a of which is inside of the plug 53, the outer end of said bearing member being threaded as indicated, to engage an adjusting handle, 55, which handle is rigidly secured to the bearing member 54 by a set screw 56. Thus by rotating the handle 55, the head 50 may be moved towards or from the axis of the hub portion 48 as desired.

As more clearly shown in Figure 4, the head 50 is split as indicated at 50a, lengthwise of the arm 49, and provided with a clamping screw 57 by which the head may be clamped in any desired position on the arm 49. The head of the screw 57 is provided with a rod 58 extending therefrom in line with the screw 57, to rigidly support the ends of a tubular member 59 surrounding the rod 58, so that the tubular member 59 may constitute a handle for moving the surfacing or grinding mechanism as desired for any particular adjustment of the head 50 on the arm 49.

The head 50 is also provided with a bore 50b extending through it parallel with the axis of the hub portion 48, which bore contains with a sliding fit, a sleeve 60 provided at its ends with threaded plugs 61 and 62 to retain ball bearings 63 and 64 in place in said sleeve, to support an arbor 65 which is extended as shown at 65a to carry a chuck 66 to engage and hold the shank 67a of a surfacing or grinding tool 67 as desired, the arbor being bored to receive said shank. The other end of the arbor 65 is bored as indicated at 65b and provided with an inwardly and longitudinally extending key 68 engaging a corresponding keyway in a cylindrical member 69 constructed to enter the bore 65b with a sliding fit, said member 69 comprising the end driving portion of a flexible shaft 70 which extends to any convenient source of power not shown, for driving the surfacing or grinding tool 67.

To hold the driving member 69 in engagement with the arbor 65, the plug 62 is provided with an externally threaded extending portion, engaged by corresponding internal threads in a sleeve 71 carried by the end of the shell of the flexible shaft 70, so that when the sleeve 71 is screwed tightly into engagement with the threads on the plug 62, the parts referred to will be held together in driving relation.

As shown in Figure 4, the nut 52 is held in position in the arm 49, by screws 72, 72 having inwardly extending cylindrical portions engaging corresponding bores in said nut, and to prevent turning movement of the head 50 on the arm 49, which arm is preferably cylindrical on its outer surface, a sliding key 73 is disposed to engage corresponding keyways in the head 50 and the arm 49 longitudinally of said arm.

As more clearly shown in Figure 5, the head 50 is provided with a set screw 74 for securely holding the sleeve 60 in place in said head. As also shown in this figure, the hub portion 48 is preferably slotted as indicated at 48a and provided with a clamping screw 75 for holding the surfacing or grinding mechanism on the chucking mechanism as desired.

As shown in Figures 2 and 3, and referring particularly to Figure 3, my chucking mechanism consists of a sleeve 76, having an outer cylindrical surface which fits the bore of the hub portion 48. The sleeve at its outer end, contains with a sliding fit, an expansion chuck 79 within which a cylindrical expanding member 80 is mounted.

The chuck 79 is provided at its outer end with an inwardly extending flange 79a, engaged by a nut 81 on the outer end of the expanding member 80, so that by turning said nut, the inner beveled end portion of the expanding member 80 may be drawn into the chuck 79 to expand the jaws of said chuck and produce a tight engagement between the chuck and the sleeve 76.

The expanding member 80 consists preferably of a tubular portion 80a threaded at its outer end, as referred to, to engage the nut 81, from which tubular portion a plurality of parallel arms 80b extend inwardly to support at the inner end of the expanding member, a ring 80c having a beveled outer surface to engage the inner beveled surfaces of the ends of the jaws of the chuck 79.

A cylindrical member 82 extends through the tubular portion 80a of the expanding member 80 with a sliding fit, the inner end of said member 82 being provided with internal threads to fit the threads on the outer end of the axle 83 with which the mechanism is to be used. The member 82 at its outer end is preferably flat sided as indicated at 82a, to receive a suitable wrench, and adjacent its flat sided portion, the member is provided with a shoulder 82b to prevent longitudinal displacement of the parts carried by the member 82, outwardly from the axle 83.

The flange portion 79a is preferably provided with a keyway 79b engaged by a key 84 carried by the tubular portion 80a to prevent relative rotation between the chuck 79 and the expanding member 80, and the chuck 79 is preferably provided on its outer surface with a longitudinal keyway 79c engaged by a key 85 carried by the sleeve 76 to prevent relative rotation between the chuck 79 and the sleeve 76.

The sleeve 76 is provided adjacent its inner end with a plurality of radial bars 86 which are preferably equally spaced from each other, and which are mounted with a sliding fit in radial slots in the sleeve 76, said bars being held in place in said slots by a ring 87 secured to a flange 76a extending outwardly from the inner end of the sleeve 76, in any convenient manner for example by screws 88 as indicated.

Each of the bars 86 is provided on its face towards the sleeve 76, with a plurality of teeth 86a having beveled faces by which the bars may be moved towards the axle 83 by a ring 89 having a correspondingly beveled edge adjacent said teeth. The ring 89 is internally threaded and engages corresponding external threads on the sleeve 76, so that rotation of the ring on the sleeve may move it towards the bars 86, and thus move the bars inwardly until their inner ends rest tightly against the axle 83.

As more clearly shown in Figures 9 and 10, each of the bars 86 is preferably provided with a plurality of indentations 86b adjacent the ring 87 for engagement by a ball detent 90 actuated by a spring 91 carried by the ring 87. This permits rough adjustment of the bars 86, depending upon the size of the axle 83, with the threaded ring 89 moved from the bars sufficiently to clear the teeth 86a, after which the threaded ring 89 is screwed towards the bars until the inner ends of the bars are tightly in engagement with the axle. The bars 86 project outwardly beyond the outer portion of the flange 76a, a sufficient amount to permit the rough adjustment of the bars referred to.

The devices above described may be employed to accurately surface brake shoes of different kinds, whether they are provided with linings or not, so that they will accurately cooperate with corresponding brake drums. To illustrate the use of my system of surfacing above referred to, I illustrate it in Figure 1 as used in connection with a brake construction of the hydraulic type commonly employed in connection with automobiles.

In Figure 1, I illustrate brake shoes of this type with the corresponding brake drum removed and with my chucking mechanism above described, mounted on the axle associated with the brake shoes. The brake shoes are shown at 92 and 93, and are pivotally mounted at their lower ends on eccentric pivot studs 94 and 95 carried by a disk 96 which is mounted in turn on a flange member 97 rigidly carried by the frame work of the automobile.

The upper ends of the brake shoes 92 and 93 are pivotally connected with rods 98 and 99 extending from a cylinder 100 to which fluid pressure may be communicated to force the upper ends of the brake shoes apart against the action of a spring 101 connected with the upper portions of the brake shoes to move them towards each other when the fluid pressure in the cylinder 100 is released. Cam mechanisms 102 and 103 are carried by the disk 96 to engage stop pins 104 and 105 carried by the brake shoes 92 and 93 to limit movement of the brake shoes towards each other under the action of the spring 101. The brake shoes 92 and 93 are provided with brake linings 106 and 107.

The surfacing or grinding mechanism is mounted on the chucking mechanism as illustrated in Figure 1, so that the surfacing or grinding tool 67 extends over the brake shoe and will operate on the entire width of the lining when the surfacing or grinding tool is rotated.

The head 50 of the surfacing or grinding mechanism is then moved towards the lining by the adjusting handle 55 until the cutter or tool 67 engages the outer surface of the lining, in which position the head 50 is clamped by the screw 57. Then with the cutter or grinder 67 in operation, the arm 49 is swung around the chucking mechanism by means of the handle 59, until the tool or cutter has passed over the entire surface of both linings.

To secure the best results, the cutter or tool 67 is fed gradually towards the axle, so that but a small amount is removed from the linings by a single surfacing or grinding operation, which however is preferably repeated until the entire braking surface of the linings is ground or finished by the tool 67, thus insuring that the braking surfaces of the linings are truly cylindrical and will engage the braking surface of the brake drum throughout their entire extent during a braking operation.

When this surfacing or grinding operation is completed, the surfacing or grinding mechanism is removed from the chucking mechanism, and the gauging devices may or may not be replaced on the chucking mechanism for final adjustment of the brake shoes and their linings, depending upon the amount that is necessarily removed from the linings in surfacing or grinding them.

The result is that the brake shoes and their linings are then not only accurately conformed to effectively engage the brake drum in braking operations, but they are also accurately adjusted to most effectively secure a braking effect in connection with any braking operation. Then the chucking mechanism is removed from the axle, and the brake shoes and their linings are ready for the replacement of the brake drum and for effective and efficient use of the braking mechanism.

While I have shown my invention in the particular embodiment above described, it will be understood that I do not limit myself to this exact construction as I may employ equivalents known to the art at the time of the filing of this application without departing from the scope of the appended claims.

I claim:

1. In a system of the class described, the combination of chucking mechanism comprising a cylindrical nut having threads for engaging an axle of a vehicle having braking mechanism associated therewith, a supporting sleeve around and spaced from said nut, chucking members between one end portion of said sleeve and said nut securing said sleeve to said nut coaxially with said axle, radial bars extending from the other end portion of said sleeve to said axle, and devices movable on said sleeve to hold said bars tightly against said axle, and brake shoe surfacing mechanism adapted to be movably supported on said sleeve.

2. In a system of the class described, the combination of chucking mechanism comprising a cylindrical nut having threads for engaging an axle of a vehicle having braking mechanism associated therewith, a supporting sleeve around and spaced from said nut, chucking members between one end portion of said sleeve and said nut securing said sleeve to said nut coaxially with said axle, radial bars extending from the other end portion of said sleeve to said axle, and devices movable on said sleeve to hold said bars tightly against said axle, brake shoe surfacing mechanism adapted to be movably supported on said sleeve to surface the braking surfaces of the shoes of said braking mechanism, said surfacing mechanism comprising a hub portion having a bore fitting said sleeve, an arm extending radially from said hub portion, a head mounted on said arm for longitudinal movement thereon, a feed screw carried by said arm and engaging said head to move the latter, an arbor extending through said head parallel with the axis of said hub portion, and a surfacing tool carried by said arbor.

3. In a system of the class described, the combination of chucking mechanism comprising a cylindrical nut having threads for engaging an axle of a vehicle having braking mechanism associated therewith, a supporting sleeve around and spaced from said nut, chucking members between one end portion of said sleeve and said nut securing said sleeve to said nut coaxially with said axle, radial bars extending from the other end portion of said sleeve to said axle, and devices movable on said sleeve to hold said bars tightly against said axle, brake shoe surfacing mechanism adapted to be movably supported on said sleeve to surface the braking surfaces of the shoes of said braking mechanism, said surfacing mechanism comprising a hub portion having a bore fitting said sleeve, an arm extending radially from said hub portion, a head mounted on said arm for longitudinal movement thereon, a feed screw carried by said arm and engaging said head to move the latter, an arbor extending through said head parallel with the axis of said hub portion, a surfacing tool carried by said arbor, a second sleeve housing said arbor, said head having a bore receiving said second sleeve with a sliding fit, and a clamping screw for holding said second sleeve in said head.

4. In a system of the class described, the combination of chucking mechanism comprising a cylindrical nut having threads for engaging an axle of a vehicle having braking mechanism associated therewith, a supporting sleeve around and spaced from said nut, chucking members between one end portion of said sleeve and said nut securing said sleeve to said nut coaxially with said axle, radial bars extending from the other end portion of said sleeve to said axle, and devices movable on said sleeve to hold said bars tightly against said axle, brake shoe surfacing mechanism adapted to be movably supported on said sleeve to surface the braking surfaces of the shoes of said braking mechanism, said surfacing mechanism comprising a hub portion having a bore fitting said sleeve, an arm extending radially from said hub portion, a head mounted on said arm for longitudinal movement thereon, a feed screw carried by said arm and engaging said head to move the latter, an arbor extending through said head parallel with the axis of said hub portion, a surfacing tool carried by said arbor, and clamping devices for holding said hub portion on said supporting sleeve with a desired degree of tightness.

5. In a system of the class described, the combination of chucking mechanism comprising a cylindrical nut having threads for engaging an axle of a vehicle having braking mechanism associated therewith, a supporting sleeve around and spaced from said nut, chucking members between one end portion of said sleeve and said nut securing said sleeve to said nut coaxially with said axle, radial bars extending from the other end portion of said sleeve to said axle, and devices movable on said sleeve to hold said bars tightly against said axle, brake shoe surfacing mechanism adapted to be movably supported on said sleeve to surface the braking surfaces of the shoes of said braking mechanism, said surfacing mechanism comprising a hub portion having a bore fitting said sleeve, an arm extending radially from said hub portion, a head mounted on said arm for longitudinal movement thereon, a feed screw carried by said arm and engaging said head to move the latter, an arbor extending through said head parallel with the axis of said hub portion, a surfacing tool carried by said arbor, and clamping devices for holding said head in desired position on said arm.

6. In a system of the class described, the combination of chucking mechanism comprising a cylindrical nut having threads for engaging an axle of a vehicle having braking mechanism associated therewith, a supporting sleeve around and spaced from said nut, chucking members between one end portion of said sleeve and said nut securing said sleeve to said nut coaxially with said axle, radial bars extending from the other end portion of said sleeve to said axle, and devices movable on said sleeve to hold said bars tightly against said axle, brake shoe surfacing mechanism adapted to be movably supported on said sleeve to surface the braking surfaces of the shoes of said braking mechanism, said surfacing mechanism comprising a hub portion having a bore fitting said sleeve, an arm extending radially from said hub portion, a head mounted on said arm for longitudinal movement thereon, a feed screw carried by said arm and engaging said head to move the latter, an arbor extending through said head parallel with the axis of said hub portion, a surfacing tool carried by said arbor, clamping devices for holding said head in desired position on said arm, said clamping devices including a screw, and a handle carried by said screw for moving said arm on said supporting sleeve.

7. A support for brake surfacing mechanism, consisting of the combination of a cylindrical nut having threads for engaging an axle of a vehicle having braking mechanism associated therewith, a supporting sleeve around and spaced from said nut, chucking members between one end portion of said sleeve and said nut securing said sleeve to said nut coaxially with said axle, radial bars extending from the other end portion of said sleeve to said axle, and devices movable on said sleeve to hold said bars tightly against said axle.

8. A support for brake surfacing mechanism, consisting of the combination of a cylindrical nut having threads for engaging an axle associated with brake shoes to be surfaced, a supporting sleeve around and spaced from said nut, and chucking members between said sleeve and said nut securing said sleeve to said nut coaxially with said axle.

9. Brake surfacing mechanism consisting of the combination of a hub portion having a bore for supporting purposes, an arm extending radially from said hub portion, a head mounted on said arm for longitudinal movement thereon, a feed screw carried by said arm and engaging said head to move the latter, an arbor extending through said head parallel with the axis of said hub portion, a surfacing tool carried by said arbor, a sleeve housing said arbor, said head having a bore receiving said sleeve with a sliding fit, and a clamping screw for holding said sleeve in said head.

JACK KUHLE.